(12) United States Patent
Schoenberg (10) Patent No.: US 8,549,031 B2
(45) Date of Patent: Oct. 1, 2013

(54) RANGE DEFINITION METHOD AND SYSTEM

(75) Inventor: Roy Schoenberg, Boston, MA (US)

(73) Assignee: TriZetto Corporation, Denver, CO (US)

( * ) Notice: Subject to any disclaimer, the term of this patent is extended or adjusted under 35 U.S.C. 154(b) by 520 days.

(21) Appl. No.: 12/836,706

(22) Filed: Jul. 15, 2010

(65) Prior Publication Data

US 2010/0281050 A1 Nov. 4, 2010

Related U.S. Application Data

(62) Division of application No. 10/727,184, filed on Dec. 3, 2003, now Pat. No. 7,774,377.

(51) Int. Cl.
*G06F 17/30* (2006.01)
*G06F 7/00* (2006.01)

(52) U.S. Cl.
USPC .......................................... 707/769; 707/803

(58) Field of Classification Search
USPC ........................ 707/769, 803, 204, 101, 102
See application file for complete search history.

(56) References Cited

U.S. PATENT DOCUMENTS

| | | | | |
|---|---|---|---|---|
| 4,882,474 A | | 11/1989 | Anderl et al. ................. 235/380 |
| 5,249,169 A | * | 9/1993 | Ogawa ....................... 369/44.34 |
| 5,579,407 A | * | 11/1996 | Murez ............................ 382/164 |
| 5,704,044 A | | 12/1997 | Tarter et al. ........................ 705/4 |
| 5,805,719 A | | 9/1998 | Pare, Jr. et al. ................. 382/115 |
| 6,076,166 A | | 6/2000 | Moshfeghi et al. ............... 726/4 |
| 6,104,798 A | * | 8/2000 | Lickiss et al. ............. 379/201.12 |
| 6,110,224 A | * | 8/2000 | Kawabe et al. ................. 717/131 |
| 6,154,466 A | * | 11/2000 | Iwasaki et al. ................. 370/466 |
| 6,463,417 B1 | * | 10/2002 | Schoenberg ........................ 705/2 |
| 6,643,644 B1 | * | 11/2003 | Furusho ................................. 1/1 |
| 6,772,141 B1 | * | 8/2004 | Pratt et al. ............................ 1/1 |
| 2002/0171673 A1 | * | 11/2002 | Brown et al. .................. 345/700 |
| 2003/0050803 A1 | * | 3/2003 | Marchosky ........................ 705/3 |
| 2003/0101238 A1 | * | 5/2003 | Davison ........................ 709/219 |
| 2003/0120622 A1 | * | 6/2003 | Nurmela et al. ................. 706/47 |

FOREIGN PATENT DOCUMENTS

WO WO 01/26020 4/2001

OTHER PUBLICATIONS

Annas, G., "A National Bill of Patient's Rights," NEJM, 338, pp. 695-699, Mar. 5, 1998.
Bakker, A., "Security in Perspective: Luxury or Must?," Int. J. Med. Inf., 49, pp. 31-37, 1998.
Baker, D., "PCASSO: Providing Secure Internet Access to Patient Information," www.saic.com.
Barrows, R., Jr., et al., "Privacy, Confidentiality, and Electronic Medical Records," J. Amer. Med. Inf. Assoc., 3, pp. 139-148, Mar. 1996.
Cimino, J., et al., "Architecture for a Web-Based Clinical Information System that Keeps the Design Open and the Access Closed," Proc. AMIA Symp., pp. 121-125, 1998.

(Continued)

*Primary Examiner* — Kuen Lu
(74) *Attorney, Agent, or Firm* — Bey & Cotropia PLLC (57) ABSTRACT

A range-conversion method and system includes receiving data records. Each data record includes one or more data fields and a field value associated with each data field. One or more data fields are identified as a range-based data field. A plurality of text-based range descriptors are defined, such that each text-based range descriptor is associated with a range of field values for one of the range-based data fields.

18 Claims, 8 Drawing Sheets

(56) References Cited

OTHER PUBLICATIONS

Dudeck, J., "Aspects of Implementing and Harmonizing Healthcare Communication Standards," Int. J. Med. Inf., 48 pp. 163-171, Feb. 1998.
Epstein, M., et al., "Security for the Digital Information Age of Medicine: Issues, Applications, and Implementation," J. Digit Imaging, 11, pp. 33-44, Feb. 1998.
Espinosa, A., "Availability of Health Data: Requirements and Solutions," Int. J. Med. Inf., 49 pp. 97-104, Mar. 1998.
Gibby, G., et al., "Availability of Records in an Outpatient Preanesthetic Evaluation Clinic," J. Clin. Mon. & Computing, 14 pp. 385-391, Aug. 1998.
Kuilboer, M., et al., "The Availability of Unavailable Information," AMIA Annual Fall Symp., pp. 749-753, 1997.
Leape, L., "Error in Medicine," JAMA, 272, pp. 1851-1857, Dec. 21, 1994.
Leape, L., "Promoting Patent Safety by Preventing Medical Error," JAMA, 280, pp. 1444-1447, Oct. 28, 1998.
Luxenberg, S., et al., "Electronic Forms: Benefits and Drawbacks of a World Wide Web-Based Approach to Data Entry," Proc. AMIA Annual Fall Symp., pp. 804-808, 1997.
Mandl, K., et al., "Electronic Patient-Physician Communication: Problems and Promise," Ann Intern. Med., 129, pp. 495-500, Sep. 15, 1998.
Masys, D., et al., "Patient-Centered Access to Secure Systems Online (PCASSO): A Secure Approach to Clinical Data Access Via the World Wide Web," Proc. AMIA Annual fall Symp., pp. 340-343, 1997.
Auston, I., et al., "Confidentiality of Electronic Health Data: Methods for Protecting Personally Identifiable Information," National Library of Medicine, CBM 95-100, Mar. 1996.
Neame, R., "Smart Cards—The Key to Trustworthy Health Information Systems," BMJ, 314 pp. 573-577, Feb. 22, 1997.
Rind, D., et al., "Maintaining the Confidentiality of Medical Records Shared Over the Internet and the World Wide Web," Ann. Intern. Med., 127, pp. 138-141, Jul. 15, 1997.
Schoenberg, R., et al., "Internet Based Repository of Medical Records that Retains Patient Confidentiality," BMJ, 321, pp. 1199-1203, Nov. 11, 2000.
Slack, W., et al., "The CCC System in Two Teaching Hospitals: A Progress Report," Int. J. Med. Inf., 54 pp. 183-196, Sep. 1999.
Stanberry, B., "The Legal and Ethical Aspects of Telemedicine 1: Confidentiality and the Patient's Rights of Access," J. Telemed. Telecare, 3, pp. 179-187, 1997.
Toyada, K., "Standardization and Security for the EMR," Int. J. Med. Inf., 48, pp. 57-60, Feb. 1998.
Woodward, B., "The Computer-Based Patient Record and Confidentiality," NEJM, 333, pp. 1419-1422, Nov. 23, 1995.
Bell Atlantic and EMX Team Up to Provide Doctors Instant Online Access to Medical Data, PR Newswire, Feb. 23, 1999.
Data, PR Newswire, Feb. 23, 1999.

\* cited by examiner

RANGE DEFINITION METHOD AND SYSTEM

CROSS REFERENCE TO RELATED APPLICATIONS

The present application is a divisional of, claims priority to and incorporates by reference, in its entirety, U.S. patent application Ser. No. 10/727,184, entitled "RANGE DEFINITION METHOD AND SYSTEM," filed Dec. 3, 2003, now U.S. Pat. No. 7,774,377.

The following U.S. patent is hereby incorporated by reference into the subject application as if set forth herein in full: (1) U.S. Pat. No. 6,463,417, entitled "METHOD AND SYSTEM FOR DISTRIBUTING HEALTH INFORMATION."

FIELD OF THE INVENTION

This invention relates to database record searching, and, more particularly, to text-based range searching of database records.

BACKGROUND

The efficient management of large sets of computer-based data is a difficult task. In addition to the physical hardware requirements needed to effectuate the storage of the data, once the data is stored, the management and organization of the data may prove daunting.

Databases are often used to manage and maintain large sets of data, such that the data is organized around a defined database structure. When retrieving data stored within the database, the individual records of the database must be searched. Unfortunately, as the number of records within the database increases, the search time associated with retrieving the data increases dramatically, which often results in unacceptable delay times and latency.

SUMMARY OF THE INVENTION

According to a first implementation, a range-conversion method includes receiving data records. Each data record includes one or more data fields and a field value associated with each data field. One or more data fields are identified as a range-based data field. A plurality of text-based range descriptors are defined, such that each text-based range descriptor is associated with a range of field values for one of the range-based data fields.

One or more of the following features may also be included. A text-string may be associated with a specific data record. The specific data record may include a range-based data field. The text-based range descriptor that is associated with the field value of the range-based data field included in the specific data record may be incorporated into the text-string associated with the specific data record. A text-string may be generated for each data record. Each text-string may include one or more text-based data descriptors, and each data descriptor may include: a field descriptor that defines a specific data field within the data record to which the text-string is related, and a value descriptor that defines the field value associated with the specific data field.

Each text-string may include a record identifier that identifies the data record to which the text-string is related. A specific data record may include a range-based data field. The text-based range descriptor that is associated with the field value of the range-based data field included in the specific data record may be incorporated, as the value descriptor, into the text-string associated with the specific data record. Each data descriptor may include one or more starting characters, one or more separator characters, and one or more ending characters. The field descriptor may be positioned between the separator characters and one of the starting characters and the ending characters. The value descriptor may be positioned between the separator characters and the other of the starting characters and the ending characters. Each range of field values is a numeric range.

According to a further implementation, a search method includes defining a target data range for a range-based data field within a database record structure of a database. The database includes a plurality of data records. A plurality of text-strings are searched. Each text string is associated with one of the data records and includes one or more text-based data descriptors. At least one data descriptor within each text-string includes: a field descriptor that defines a specific range-based data field within the data record to which the text-string is related, and a text-based range descriptor that is associated with a range of field values for the specific range-based data field. A first result set is generated by identifying one or more text-strings that include a text-based range descriptor that is essentially equivalent to the target data range.

One or more of the following features may also be included. The data record associated with one or more of the text-strings identified in the first result set may be retrieved. Each text-string further may include a record identifier for associating the text-string and the data record to which the text-string is related. Each range of field values may be a numeric range. Each data descriptor may include one or more starting characters, one or more separator characters, and one or more ending characters. The field descriptor may be positioned between the separator characters and one of the starting characters and the ending characters. The text-based range descriptor may be positioned between the separator characters and the other of the starting characters and the ending characters. A target value may be defined for each of one or more data fields within the database record structure of the database.

The plurality of data records included in the database may be searched. A second result set may be generated by identifying one or more data records that include a field value that is essentially equivalent to at least one of the target values. One or more of the data records identified in the second result set may be retrieved. The data records may be representative of the medical records of patients.

According to a further implementation, a computer program product resides on a computer readable medium on which a plurality of instructions are stored. When executed by the processor, the instructions cause that processor to receive data records. Each data record includes one or more data fields and a field value associated with each data field. One or more data fields are identified as a range-based data field. A plurality of text-based range descriptors are defined. Each text-based range descriptor is associated with a range of field values for one of the range-based data fields.

According to a further implementation, a computer program product resides on a computer readable medium on which a plurality of instructions are stored. When executed by the processor, the instructions cause that processor to define a target data range for a range-based data field within a database record structure of a database. The database includes a plurality of data records. A plurality of text-strings are searched. Each text string is associated with one of the data records and includes one or more text-based data descriptors. At least one data descriptor within each text-string includes a field descriptor that defines a specific range-based data field within the data record to which the text-string is related, and a text-based range descriptor that is associated with a range of field values for the specific range-based data field. A first result set is generated by identifying one or more text-strings that include a text-based range descriptor that is essentially equivalent to the target data range.

According to a further implementation, a searching system includes a server system having a computer processor and associated memory. The server system includes a database having a plurality of data records. The server system is configured to receive data records. Each data record includes one or more data fields and a field value associated with each data field. One or more data fields are identified as a range-based data field. A plurality of text-based range descriptors are defined, such that each text-based range descriptor is associated with a range of field values for one of the range-based data fields.

According to a further implementation, a searching system includes a server system having a computer processor and associated memory. The server system includes a database having a plurality of data records. The server system is configured to define a target data range for a range-based data field within a database record structure of a database. The database includes a plurality of data records. A plurality of text-strings are searched. Each text string is associated with one of the data records and includes one or more text-based data descriptors. At least one data descriptor within each text-string includes a field descriptor that defines a specific range-based data field within the data record to which the text-string is related, and a text-based range descriptor that is associated with a range of field values for the specific range-based data field. A first result set is generated by identifying one or more text-strings that include a text-based range descriptor that is essentially equivalent to the target data range.

One or more of the following features may also be included. The above-described systems may be coupled to a distributed computing network.

According to a further implementation, a data structure includes a database having a plurality of data records. Each data record includes one or more data fields. A field value is associated with each data field. The data structure includes a text-string for one or more data records. Each text-string has one or more text-based data descriptors, such that each data descriptor includes: a field descriptor that defines a specific range-based data field within the data record to which the text-string is related, and a text-based range descriptor that is associated with a range of field values for the specific range-based data field.

One or more of the following features may also be included. The text-strings may be stored within a text-based data file, such as an ASCII file.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
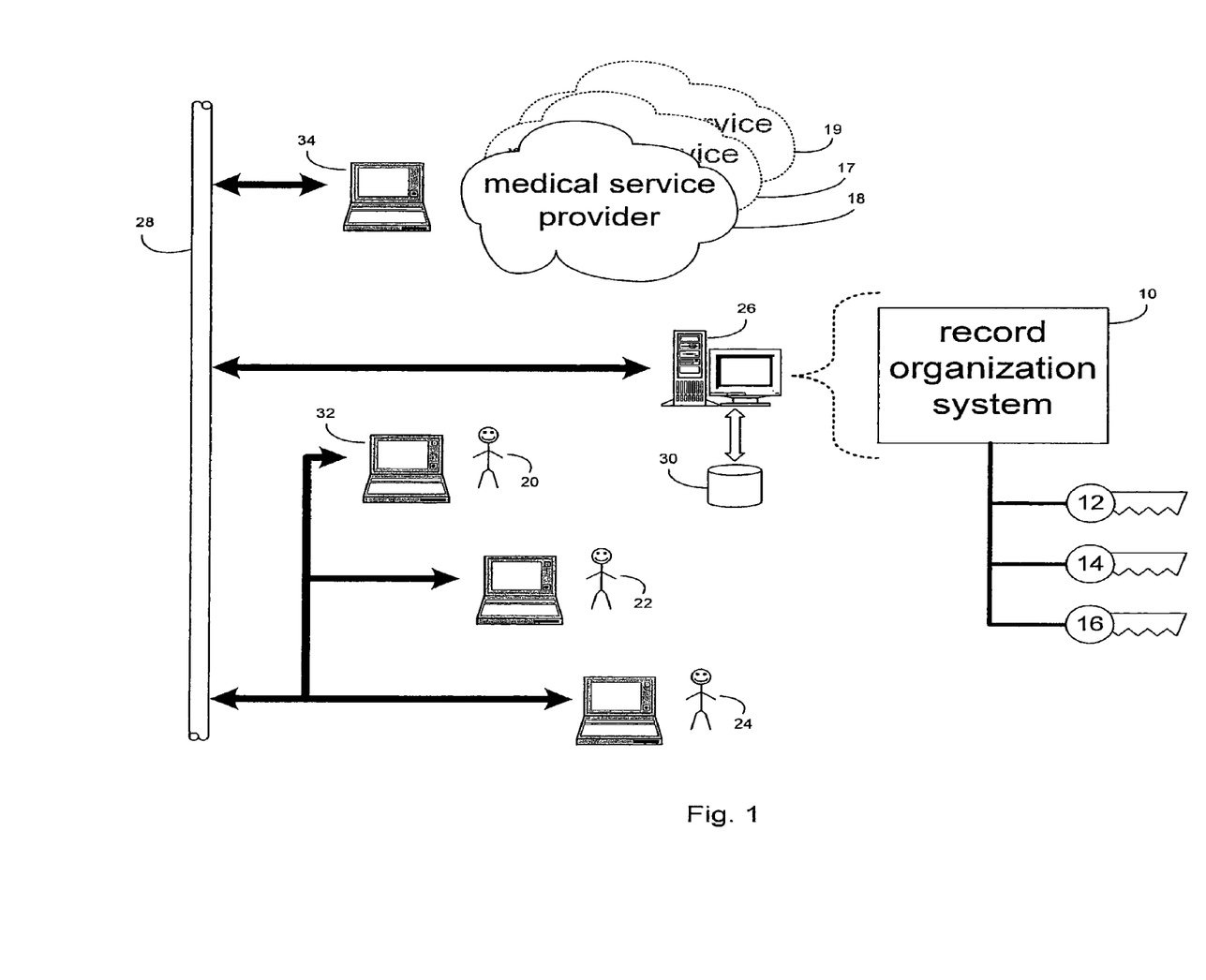
FIG. 1 is a diagrammatic view of a record organization system coupled to a distributed computing network.

Referring to FIG. 1, there is shown a record organization system 10 that manages the various access keys 12, 14, 16 possessed by a medical service provider 18. Access keys 12, 14, 16 allow the medical service provider 18 to access the medical records (not shown) of various patients 20, 22, 24 (respectively).

Record organization system 10 typically resides on and is executed by a computer 26 that is connected to a network 28. Computer 26 may be a web server running a network operating system, such as Microsoft Window 2000 Server™, Novell Netware™, or Redhat Linux™. Typically, computer 26 also executes a web server application, such as Microsoft IIS™, Novell Webserver™, or Apache Webserver™, that allows for HTTP (i.e., HyperText Transfer Protocol) access to computer 26 via network 28.

The instruction sets and subroutines of record organization system 10, which are typically stored on a storage device 30 coupled to computer 26, are executed by one or more processors (not shown) and one or more memory architectures (not shown) incorporated into computer 26. Storage device 30 may be, for example, a hard disk drive, a tape drive, an optical drive, a RAID array, a random access memory (RAM), or a read-only memory (ROM).

As will be explained below in greater detail, a patient (e.g., patient 20) typically provides a key (e.g., access key 12) to medical service provider 18 through a patient computer 32, which is also connected to network 28. Additionally, medical service provider 18 accesses record organization system 10 through a client computer 34.

Figure 2:
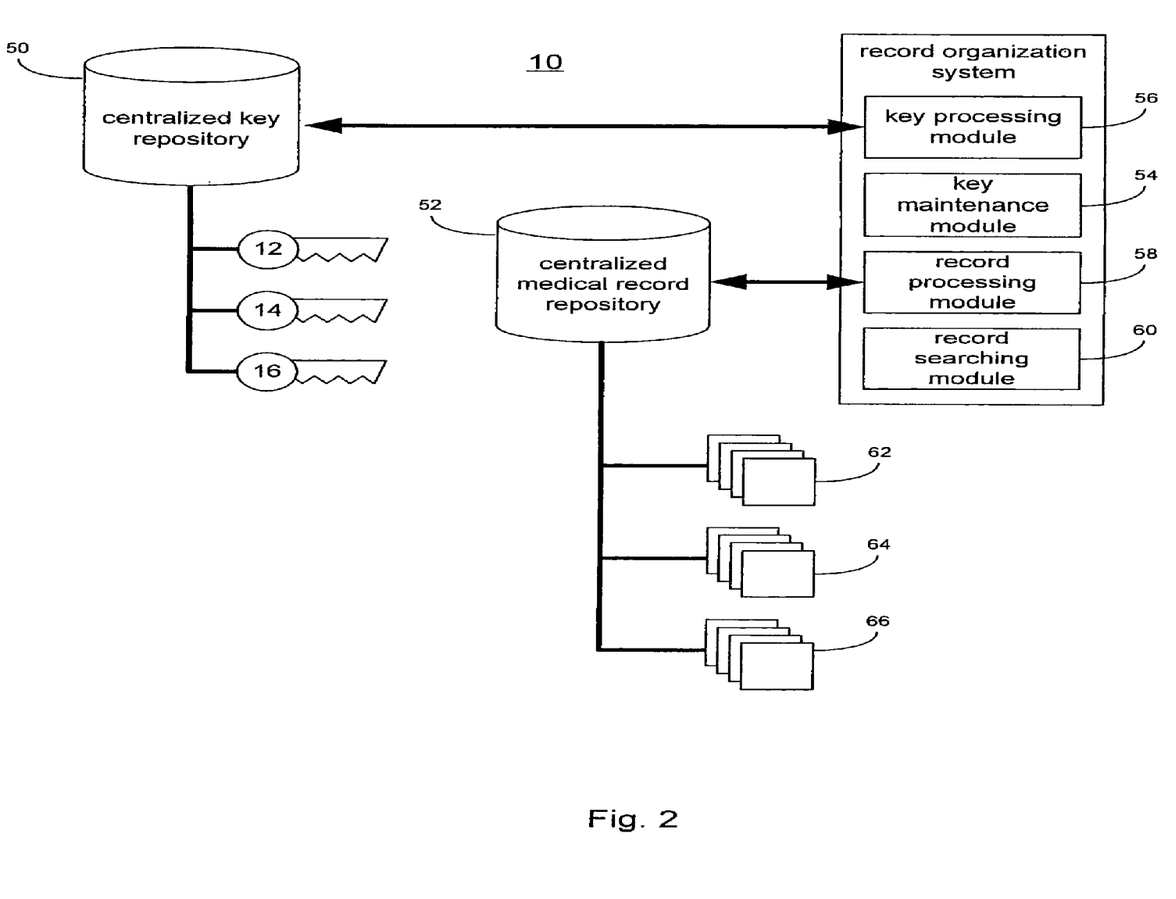
FIG. 2 is a more-detailed diagrammatic view of the record organization system of FIG. 1.

Referring also to FIG. 2, record organization system 10 includes a centralized key repository 50 and a centralized medical records repository 52. Additionally, record organization system 10 includes a key maintenance module 54, a key processing module 56, a record processing module 58, and a record searching module 60, each of which will be discussed below in greater detail.

Centralized medical records repository 52 allows for the centralized storage of medical records 62, 64, 66 concerning various patients 20, 22, 24 respectively. As disclosed in U.S. Pat. No. 6,463,417, medical records 62, 64, 66 are typically divided into portions or levels, in that certain portions are considered more confidential than other portions. For example, a portion/level of the medical record that may be considered the least confidential might include general patient identification information and information concerning the patient's blood type and allergies. A portion/level of a medical record that may be considered to have an intermediate level of confidentiality might include information concerning the serological data, psychiatric data, cardiology data, and genetic data. A portion/level of the medical record that may be considered highly confidential may include infectious disease (e.g., HIV, and sexually transmitted diseases) data.

This specific assignment of confidentiality levels and the apportionment of the medical record into various portions/levels is for illustrative purposes only and is not intended to limit the scope of this disclosure.

Medical records 62, 64, 66 may be incrementally generated/configured online by the various medical service providers that provide care to patients 20, 22, 24. Alternatively, existing medical records may be uploaded (i.e., transferred) to medical records repository 52 from a remote storage location (not shown).

Figure 3:
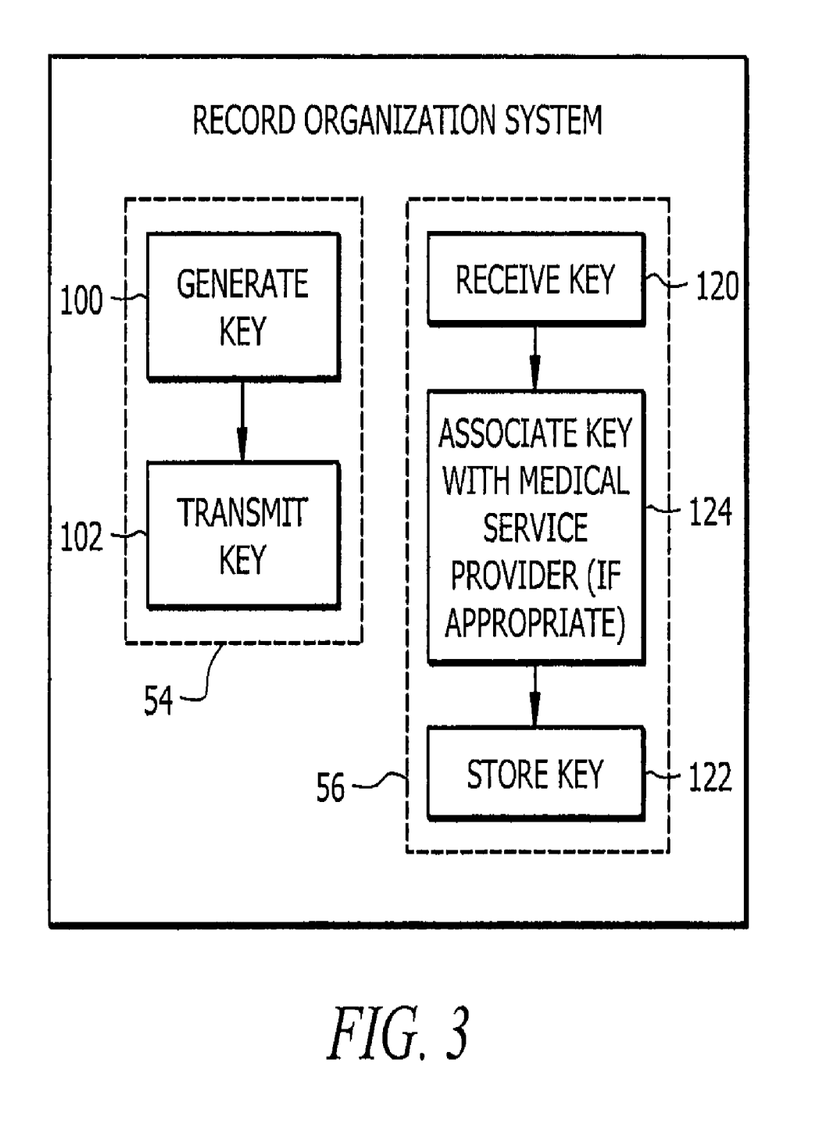
FIG. 3 is a diagrammatic view of a key maintenance module and a key processing module of the record organization system of FIG. 1.

Referring also to FIG. 3, patients 20, 22, 24 use key maintenance module 54 to generate 100 access keys 12, 14, 16 that grant access to various portions of the respective medical records 62, 64, 66. Accordingly, though the use of key maintenance module 54, the patient can generate access keys that not only regulate who has access to their medical records, but also regulate the level of access (i.e., which portions of a patient's medical record are viewable by the medical service provider to which the key is provided). Examples of access keys 12, 14, 16 are passwords (that allow access to various portions of a medical record) and decryption keys (that decrypt various portions of an encrypted medical record).

Typically, key maintenance module 54 is a web-enabled application that is accessed by the patients (e.g., patient 20) through a browser application (e.g., Microsoft Internet Explorer™ or Netscape Navigator™) that is running on patient computer 32. Alternatively, key maintenance module 54 may be a local application that is executed locally on patient computer 32.

As stated above, key maintenance module 54 allows a patient to generate 100 an access key for a specific medical service provider that grants, to that medical service provider, a defined level of access to that patient's medical records. Once this access key is generated, the access key is transmitted 102 to the medical service provider 18. This transmission of the access key may be implemented by transferring the access key from the patient to the medical service provider. This may occur by attaching the access key to an email that is transmitted to the medical service provider. Once received, the medical service provider may then transfer the newly-generated key to the key processing module 56 (to be discussed below in greater detail) of the record organization system 10. Alternatively, the patient may directly transfer the newly-generated key to the key processing module 54 of the record organization system 10.

Regardless of the manner in which the patient transfers the access key to the medical service provider, the access key will ultimately be received 120 by key processing module 56, which receives any access keys (e.g., keys 12, 14, 16) generated and transmitted by patients 20, 22, 24. Once these keys are received 120, they are stored 122 on centralized key repository 50. Additionally, if record organization system 10 is servicing multiple medical service providers (e.g., medical service providers 17, 18, 19), the received keys are associated 124 with the appropriate medical service provider so that the keys transmitted to a first provider are not available to a second provider.

Figure 4:
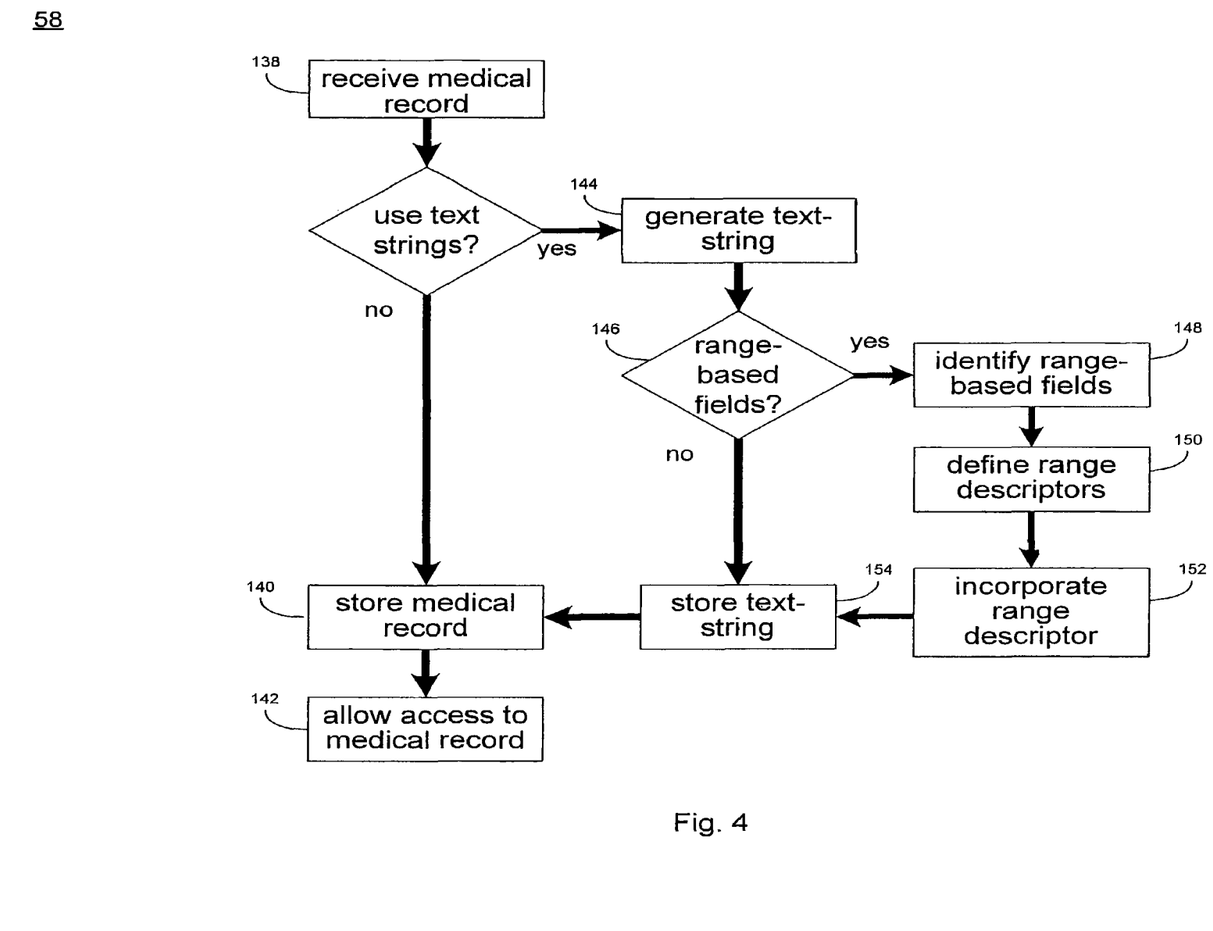
FIG. 4 is a diagrammatic view of a record processing module of the record organization system of FIG. 1.

Referring also to FIG. 4, when medical records (i.e., uploaded existing records, newly-generated records, and/or amended records) are initially received 138, record processing module 58 stores 140 the medical record on centralized medical record repository 52. Typically, medical record repository 52 is a database that allows for the organized storage and retrieval of the medical records 62, 64, 66.

Once these medical records are stored on medical record repository 52, record processing module 58 allows the medical service provider 18 to access 142 the medical records 62, 64, 66 stored on medical records repository 52. However, the medical service provider 18 is only given access to the portions of the medical records for which the medical service provider 18 possesses the appropriate key. For example, assume that medical service provider 18 is a medical clinic that provides an array of medical services to its patients. Further, assume that patient 20 uses medical service provider 18 for all of their medical needs; patient 22 uses medical service provider 18 solely for treatment of depression; and patient 24 uses medical service provider 18 solely for treatment of HIV.

Concerning the access keys generated by each of these patients for medical service provider 18: patient 20 would typically provide medical service provider 18 with an access key (i.e., key 12) that grants access to their entire medical record; patient 22 would typically provide medical service provider 18 with an access key (i.e., key 14) that grants access to the general and psychiatric portions of their medical record; and patient 22 would typically provide medical service provider 18 with an access key (i.e., key 16) that grants access to the general and infectious disease portions of their medical record.

Record processing module 58 is typically a web-enabled application that is accessed by the medical service provider 18 through a browser application (e.g., Microsoft Internet Explorer™ or Netscape Navigator™) that is running on client computer 34. Typically, medical service provider 18 logs into key organization system 10 using an encrypted SSL (i.e., secure sockets layer) connection.

Figure 5:
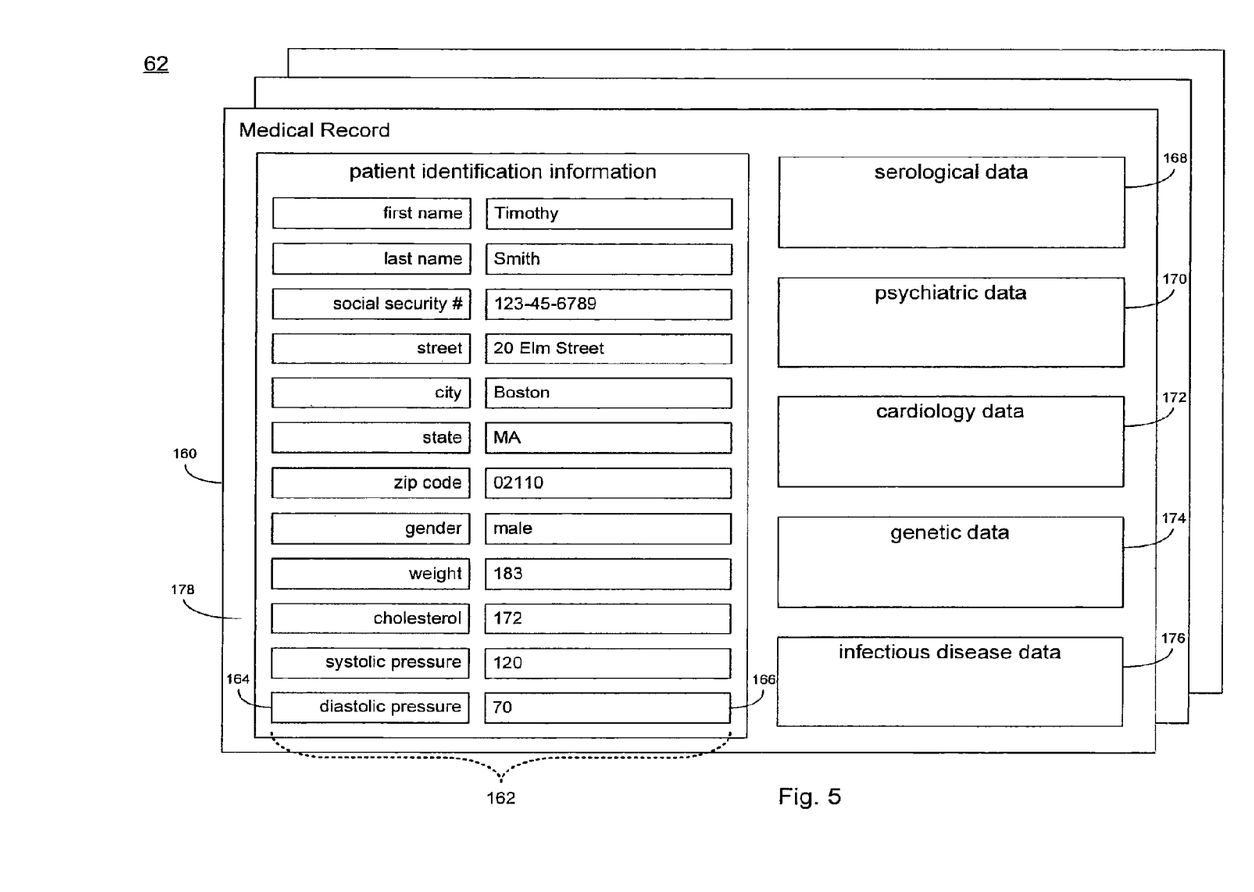
FIG. 5 is a diagrammatic view of a medical record.

Referring also to FIG. 5, medical records 62, 64, 66 are typically database records 160 that contain data fields (e.g., data field 162), each of which includes a field name 164 and a field value 166. Additionally, as discussed above, medical records 62, 64, 66 includes serological data 168, psychiatric data 170, cardiology data 172, genetic data 174, and infectious disease data 176, each of which may be further broken down into data fields.

To enhance the searchability of centralized medical record repository 52, record processing module 58 may process each record to generate 144 a text string that relates to that record. A example of a text string for record 160 is:

<first_name:timothy><last_name:smith><ss#: 123456789><street:20 elm street><city:boston><state: ma><zip:02110><gender:male><weight:183><cholesterol:172><sys_press:12><dia_press: 70><data_record: 1243562>

The above-listed text string is a textual representation of the field-based data included within the "patient identification information" portion of the medical record 62 of patient 22 (i.e., Timothy Smith).

The text string includes one or more data descriptors (e.g., <dia_press:70>) each of which includes a field descriptor (e.g., dia_press) and a field value (e.g., 70). The field descriptor and the field value are typically separated by a separator character (e.g., :), and the data descriptor begins with beginning characters (e.g., <) and ends with ending characters (e.g., >).

The field descriptor defines a specific data field within the data record to which the text-string is related. For example, the field descriptor "dia_press" relates to data field 164 in record 62. Further, the value descriptor defines the field value associated with the same specific data field. For example, the value descriptor "70" relates to field value 166.

The text string typically also includes a record identifier (e.g., <data_record: 1243562>) that associates the text-string with the medical record upon which the text-string is based, so that the medical record may be subsequently retrieved.

Various types of data fields (e.g., data field 162) may be included in database records (e.g., record 160) and, therefore, the medical records of patients 20, 22, and 24. The type of data field varies depending on the type of field value expected to be entered. For example, some data fields are unstructured text data fields (e.g., first name, last name, street, city, and state). Additionally, data fields may require structured text data (e.g., Gender). Other data fields are binary data fields, in that they require a yes or no answer (e.g., a data field inquiring as to whether a patient is a smoker; not shown). Data fields may also be numeric data fields that require structured numerical data (e.g., the patient's social security number, or the patient's phone number (not shown)). Further, data fields may be unstructured numeric data fields, in which the field value entered spans a numeric range. Examples of this type of data field are weight, cholesterol, systolic pressure, diastolic pressure, and age (not shown).

When generating 144 a text string for a data record that contains data fields in which the possible field values span a numeric range (i.e., range-based data fields), it is often desirable to break down the numeric range into manageable portions (i.e., sub-ranges) to enhance searchability.

For example, total cholesterol readings are often divided by the medical community into the following ranges: <150 is ideal; 150-199 is desirable; 200-239 is a moderate risk; 240-274 is a high risk; and >275 is an extremely high risk.

Accordingly, when generating 144 text-strings, if it is determined 146 that the database records contain range-based data fields (e.g., the "cholesterol" data field 178), the user (e.g., a medical service provider, an administrator, etc.) may identify 148 one or more range-based data fields (within the database record structure) that the user intends to break down into manageable portions.

For example, as discussed above, total cholesterol readings are typically broken down into five ranges. If desired, record processing module 58 may define 150 multiple range descriptors, such that a unique text-based range descriptor is associated with each one of the total cholesterol ranges defined above. For example, a "1" may represent a total cholesterol reading of <150, a "2" may represent a total cholesterol reading of 150-199; a "3" may represent a total cholesterol reading of 200-239, a "4" may represent a total cholesterol reading of 240-274, and a "5" may represent a total cholesterol reading of >275. Therefore, one of the five range descriptors (i.e., "1", "2", "3", "4", or "5") may be incorporated 152 into each text-string instead of the actual cholesterol reading. This results in the above-described text-string appearing as follows:

<first_name:timothy><last_name:smith><ss#: 123456789>
   <street:20 elm street><city:boston><state:ma><zip: 02110>
   <gender:male><weight: 183><cholesterol:2><sys_press: 12)>
   <dia_press:70><data_record: 1243562>

The incorporation of a text-based range descriptor into a text-string may occur when the text-string is initially generated, or may occur as a modification to an existing text-string.

The text-strings generated by record processing module 58 are typically stored 154 within centralized medical record repository 52. The text-strings may be stored in a group as a single text file, such as an ASCII (i.e., American Standard Code for Information Interchange) file. Alternatively, the text-strings may be stored as individual text-based files. Regardless of the manner in which the text-strings are stored, as will be discussed below, by searching the text strings for the occurrence of specific data descriptors, the medical records that contain desired information may be quickly identified.

Figure 6:
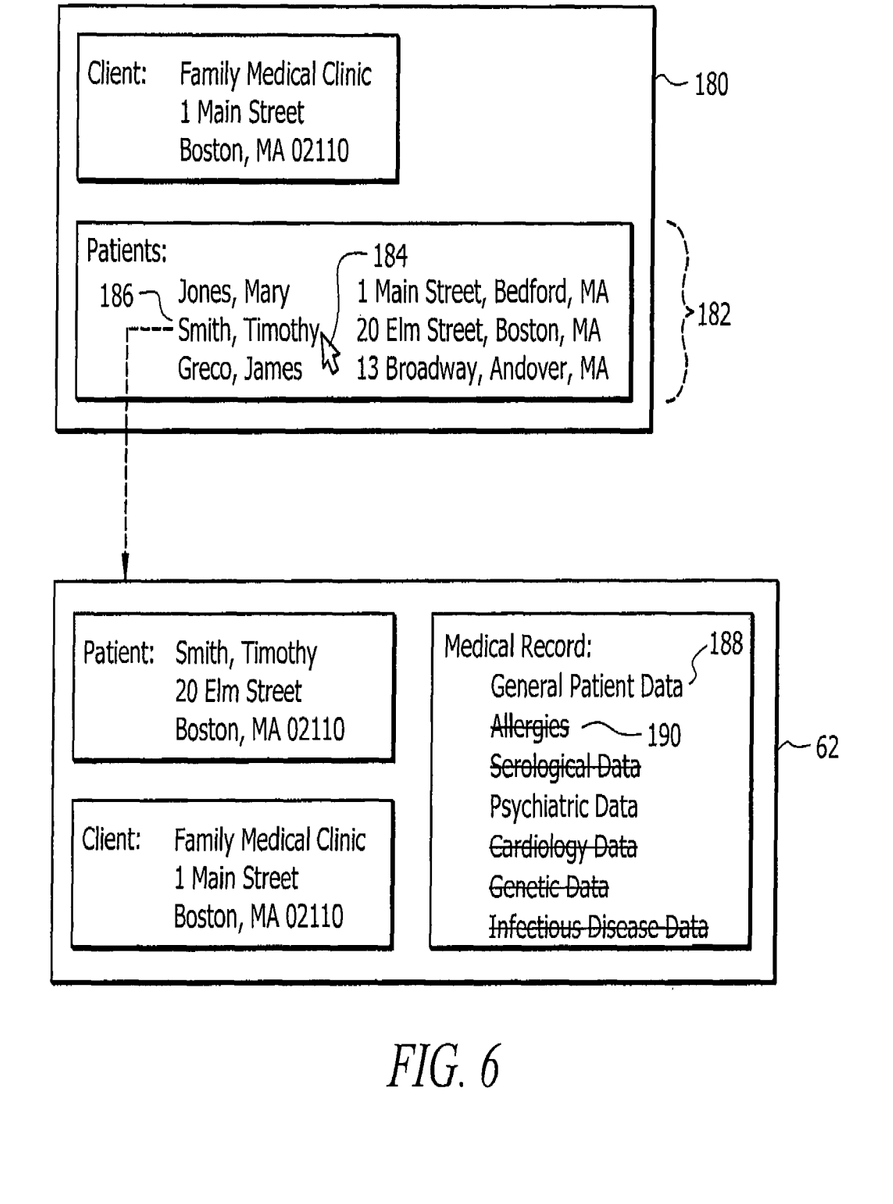
FIG. 6 is a diagrammatic view of a patient selection display screen rendered by the record organization system of FIG. 1.

Referring also to FIG. 6, when accessing record organization system 10, record processing module 58 provides the medical service provider 18 with a rendered screen display 180 that includes a list of patient identifiers 182. Patient identifiers 182 define the particular patient(s) who provided access keys to medical service provider 18 (i.e., granting medical service provider 18 access to various portions of their medical record(s)). The patient identifiers 182 may be any element that uniquely identifies the patient, such as the patient's name, the patient's social security number, or a unique patient number. In this particular example, Mary Jones is patient 20, Timothy Smith is patient 22, and James Greco is patient 24.

The presence of each of these names in the list of patient identifiers 182 indicates that a key was received from that patient. In order to access the medical record of a patient for which the medical service provider has a key (i.e., for one of the patients listed in the list of patient identifiers 182), the medical service provider 18 selects the appropriate identifier using a mouse pointer 184 (or some other pointing device, not shown). For example, if the medical service provider wanted to access the medical record of Timothy Smith (i.e., patient 22), medical service provider 18 would typically click (using a mouse) on the specific identifier 186 associated with Timothy Smith. Record processing module 58 would then, in turn, use access key 14 to access (i.e., retrieve, decrypt, and display) medical record 62, the medical record of Timothy Smith, i.e., patient 22.

Medical record 62 may be displayed in a separate window or displayed full screen on the display of client computer 34. As discussed above, the key provided to the medical service provider 18 only allows access to the portions) of the patient's medical record that the patient wishes to allow access. Further, Timothy Smith (i.e., patient 22) is being treated by medical service provider 18 for depression and access key 14 grants access to the general and psychiatric portions of Timothy Smith's medical record. Accordingly, a link (e.g., link 188) to each available portion is displayed on the right-hand side of medical record 62. However, access key 14 does not permit access (i.e., prohibits access) to the other portions of Timothy Smith's medical record, namely Allergies, Serological Data, Cardiology Data, Genetic Data, and Infectious Disease Data. Accordingly, the links (e.g., link 190) to the unavailable data portions are struck-through. Other methods of differentiating the available portions from the unavailable portions of a medical record may be used, such as graying-out or not displaying links to the unavailable portions.

By clicking on the links to the available portions of the medical record, a specific available portion is displayed by record processing module 58.

Figure 7:
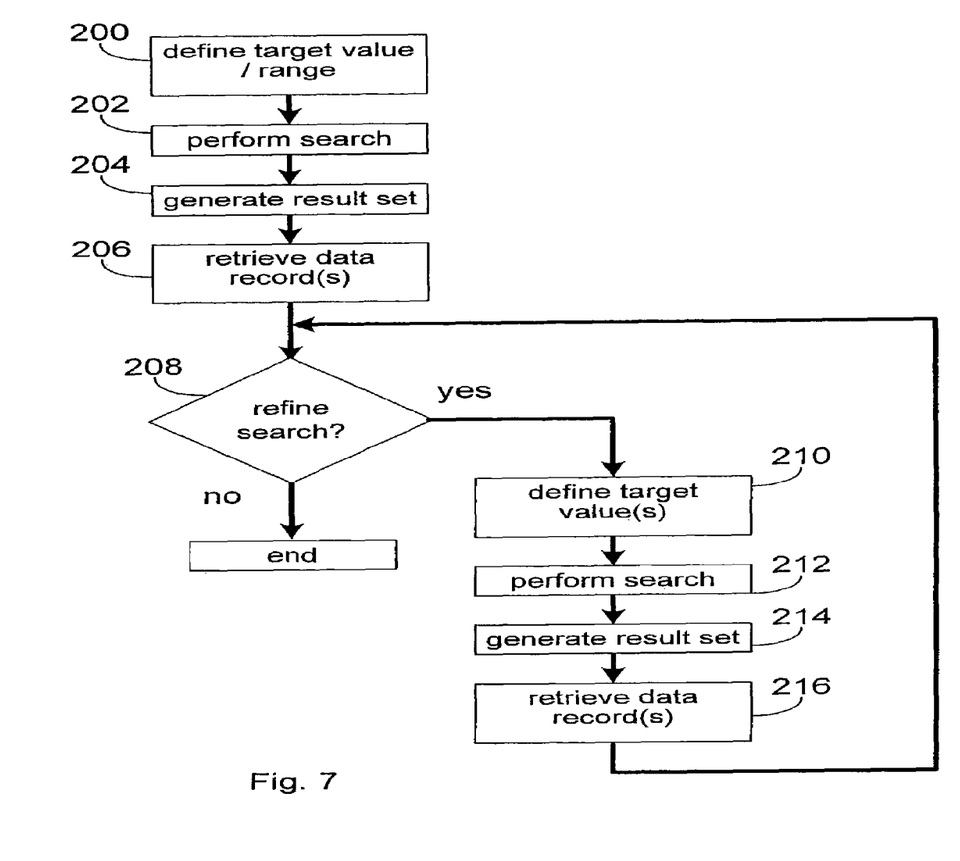
FIG. 7 is a diagrammatic view of a record searching module of the record organization system of FIG. 1.

Referring also to FIG. 7, record searching module 60 facilitates the searching of medical records stored on the centralized medical record repository 52. This searching may be performed by a medical service provider (e.g., medical service provider 18) or an administrator of record organization system 10. However, the party doing the searching may only search the portions of the medical records to which they are granted access. This access may be based on the possession of keys (i.e., for medical service providers) or administrative privileges (i.e., for administrators), for example.

Record searching module 60 allows a user (e.g., a medical service provider, an administrator, etc.) to define 200 a target value or range of values for one or more of the data fields (e.g., data field 162) within the database record structure of the medical records (e.g., medical record 62) stored on centralized medical record repository 52. This target value may be a name, a number, a key word, or a text-based range descriptor, for example.

The database record structure refers to the field structure of a database records. For example, database record 62 includes twelve specific data fields (namely, first name, last name, social security number, street, city, state, zip code, gender, weight, cholesterol, systolic pressure, and diastolic pressure) and five data portions (namely serological data, psychiatric data, cardiology data, genetic data, and infectious disease data). As stated above, the patient controls the access to the various portions of their medical record through the use of access keys. Additionally, these portions are typically subdivided into numerous data fields.

Typically, record searching module 60 is a web-enabled application that is accessed by the user (e.g., medical service provider 18) through a browser application (e.g., Microsoft Internet Explorer™, or Netscape Navigator™) that is running on a computer (e.g., client computer 34). Alternatively, record searching module 60 may be a locally-executed application.

Figure 8:
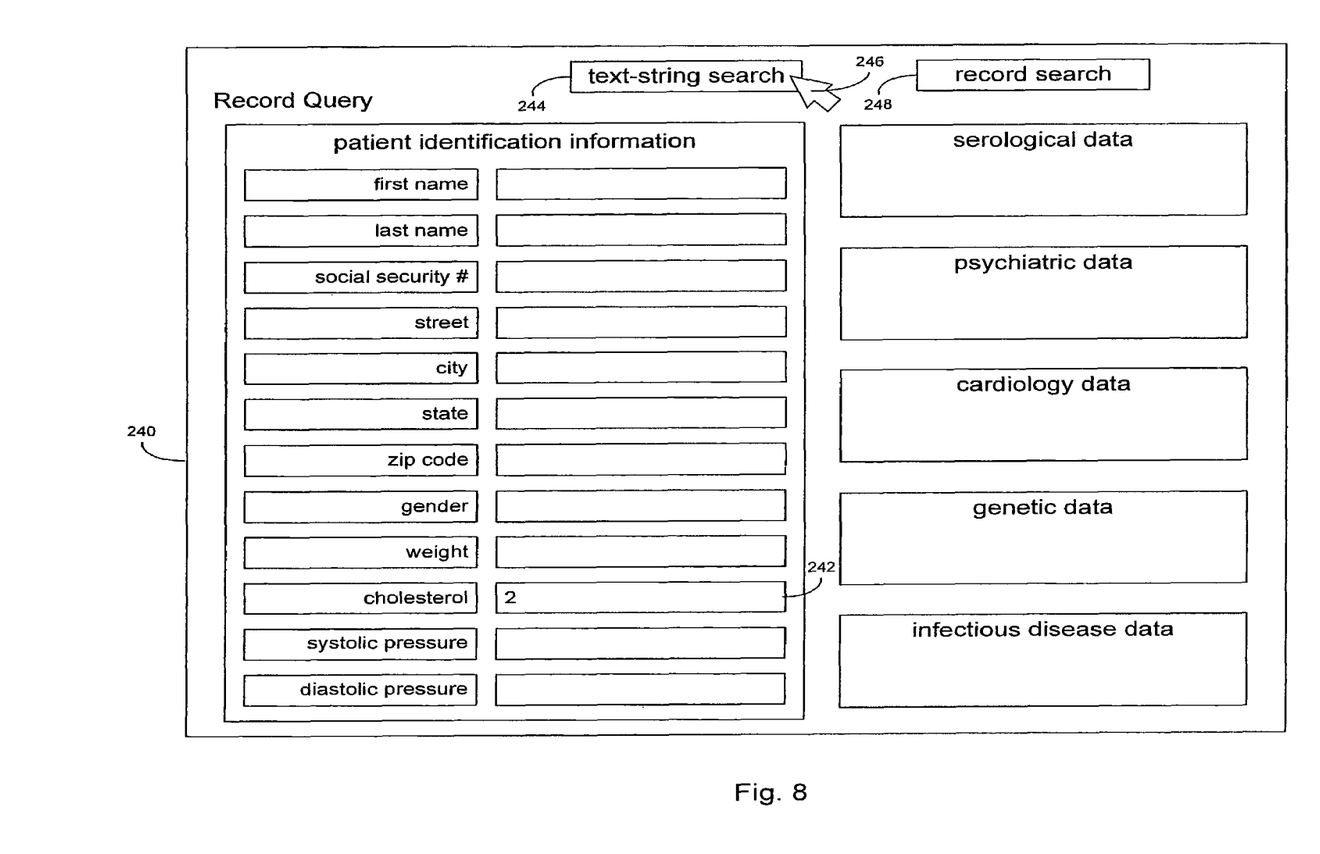
FIG. 8 is a diagrammatic view of a query definition display screen rendered by the record organization system of FIG. 1.

Referring also to FIG. 8, when a user initiates a search, a query definition display 240 is rendered by record searching module 60 that allows the user to define 200 the search terms (e.g., target values and/or target ranges) of a database record query. For example, if medical service provider 18 wished to search the medical records (to which they have access) to determine which of their patients had an ideal total cholesterol reading (i.e., a total cholesterol reading of 150-199; which was assigned text-based range descriptor "2"), medical service provider 18 would enter the search term "2" into field 242 of display 240. In addition to text-based range descriptors, these search terms may be whole words, portions of words, wildcard descriptors (e.g., *), or any combination thereof.

Medical service provider 18 would then initiate 202 the search by "clicking" on the text-string search button 244 with mouse pointer 246. As, in the example, medical service provider 18 only has access to the medical records of three patients, namely Mary Jones (i.e., patient 20), Timothy Smith (i.e., patient 22), and James Greco (i.e., patient 24), the result list (not shown) for the query includes two entries, namely Mary Jones (who has a total cholesterol reading of 153) and Timothy Smith (who has a total cholesterol reading of 172). As James Greco has a total cholesterol reading of 206, he is not included in the result list.

When executing a text-string based search, the search is executed by associating the search term(s) entered (i.e., "2") with the data field into which that search term was entered (i.e., "cholesterol"). This, in turn generates a search term in the form of a data descriptor (i.e., <cholesterol:2>). Therefore, when executing the text-string search, the text string for each medical record available to the initiator of the search is examined to determine if any of these text strings contain the search term data descriptor. As discussed above, the text-string associated with patients Mary Jones (i.e., patient 20) and Timothy Smith (i.e., patient 22) include the data descriptor <cholesterol:2>. Additionally, each text-string includes a record identifier that associates the text-string to the medical record on which it is based. Therefore, once the relevant text strings are determined, the related medical records are easily ascertained. By performing text-based searches on text-strings, the search speed is increased and latency is reduced.

The result list (not shown) generated 204 in response to this query includes the names of Mary Jones and Timothy Smith. Typically, the result list is in the form of an HTML document. As the patient names are typically embedded links, when the user clicks on one or more of these links, the corresponding medical record is retrieved 206.

In addition to the text-based searches performed above, a record-based search may also be performed. Typically, a text-based search is performed as an initial search to generate a first result set. Often, this result set is quite large and, therefore, a secondary search may be performed on the first result set. Accordingly, once a determination 208 is made that the first result set needs to be further reduced in size, a secondary record-based search may be performed by defining 210 additional search terms (i.e., target values) that further restrict the result set. The new search is then performed 212 and a refined result set is generated 214 and presented to the user.

Assuming that Timothy Smith weighs 230 pounds, if the additional search term defines the desired weight as "<200 pounds", Mary Jones will be the only patient specified in the second result set, as she weighs 143 pounds. As above, the medical record(s) specified in the second result set are easily retrieved 216 by clicking on the appropriate link. The search terms may be repeatedly refined until the result set is reduced to a size acceptable to the user.

As stated above, the secondary query may be performed using traditional record-based searching technique employed by database search engines. If record-based searching is desired, a record based search is initiated 212 by "clicking" on the record-based search button 248 with mouse pointer 246.

While medical record 66 is shown to include a plurality of links to the available portions of the medical record, other configurations are possible. For example, when clicking on a specific identifier (e.g., identifier 164), a medical record may be displayed that only includes the portions to which the medical service provider has access.

While the centralized key repository 50 and the centralized medical record repository 52 are described above as being located on a remote server, other configurations are possible. For example, as is known in the art, one or more of these repositories may be distributed across multiple computers/servers.

A number of implementations have been described. Nevertheless, it will be understood that various modifications may be made. Accordingly, other implementations are within the scope of the following claims.

What is claimed is:

1. A search method comprising:
    executing, by a record searching module, a first search of a plurality of data records stored in a database for a target data range,
    the database comprising a database record structure including range-based numeric data fields each specifying at least one defined target data range,
    the first search including searching a plurality of text-strings associated with at least one of the data records,
    each text string comprising one or more text-based data descriptors including a field descriptor that defines a specific range-based numeric data field within the data record to which the text- string is related, and
    a text-based range descriptor that specifies one of a plurality of predetermined ranges of numeric values for the specific range-based numeric data field;
    generating, by the record searching module, a first result set by identifying one or more text-strings that include a text-based range descriptor that specifies the target data range;
    executing, by the record searching module, a second search of the plurality of data records stored in the database for target values, wherein each of one or more numeric data fields within the database record structure of the database has a defined target value; and generating a second result set by identifying one or more data records that include a field value that is equivalent to at least one of the target values.

2. The search method of claim 1 further comprising retrieving, by the record searching module, a data record associated with one or more of the text-strings identified in the first result set.

3. The search method of claim 1 wherein each text-string further includes a record identifier for associating the text-string and the data record to which the text-string is related.

4. The search method of claim 1 wherein each data descriptor includes one or more starting characters, one or more separator characters, and one or more ending characters.

5. The search method of claim 4 wherein the field descriptor is positioned between the separator characters and one of the starting characters and the ending characters.

6. The search method of claim 5 wherein the text-based range descriptor is positioned between the separator characters and the other of the starting characters and the ending characters.

7. The search method of claim 1 further comprising retrieving, by the record searching module, one or more of the data records identified in the second result set.

8. The search method of claim 1 wherein the data records are representative of the medical records of patients.

9. A computer program product residing on a non-transitory computer readable medium having a plurality of instructions stored thereon which, when executed by a processor, direct the processor to:

execute a first search of a plurality of data records stored in a database for a target data range, the database comprising a database record structure including range-based numeric data fields each specifying at least one defined target data range, the first search including searching a plurality of text-strings associated with at least one of the data records, each text string comprising one or more text-based data descriptors including a field descriptor that defines a specific range-based numeric data field within the data record to which the text-string is related, and a text-based range descriptor that specifies one of a plurality of predetermined ranges of values for the specific range-based numeric data field;

generate a first result set by identifying one or more text-strings that include a text-based range descriptor that specifies the target data range;

executing a second search of the plurality of data records stored in the database for target values, wherein each of one or more numeric data fields within the database record structure of the database has a defined target value; and generating a second result set by identifying one or more data records that include a field value that is essentially equivalent to at least one of the target values.

10. The computer program product of claim 9 further comprising instructions for retrieving a data record associated with one or more of the text-strings identified in the first result set.

11. The computer program product of claim 9 wherein each text-string further includes a record identifier for associating the text-string and the data record to which the text-string is related.

12. The computer program product of claim 9 wherein each data descriptor includes one or more starting characters, one or more separator characters, and one or more ending characters.

13. The computer program product of claim 12 wherein the field descriptor is positioned between the separator characters and one of the starting characters and the ending characters.

14. The computer program product of claim 13 wherein the text-based range descriptor is positioned between the separator characters and the other of the starting characters and the ending characters.

15. The computer program product of claim 9 further comprising retrieving one or more of the data records identified in the second result set.

16. The computer program product of claim 9 wherein the data records are representative of the medical records of patients.

17. A searching system comprising:

a server system including a computer processor and associated memory, the server system having a database that includes a plurality of data records;

wherein the server system is configured to execute, by a record searching module, a first search of a plurality of data records stored in a database for a target data range, the database comprising a database record structure including range-based numeric data fields each specifying at least one defined target data range, the first search including searching a plurality of text-strings associated with at least one of the data records, each text string comprising one or more text-based data descriptors including a field descriptor that defines a specific range-based numeric data field within the data record to which the text-string is related, and a text-based range descriptor that specifies one of a plurality of predetermined ranges of values for the specific range based numeric data field, generate, by the record searching module, a first result set by identifying one or more text-strings that include a text-based range descriptor that specifies the target data range;

execute a second search of the plurality of data records stored in the database for target values, wherein each of one or more numeric data fields within the database record structure of the database has a defined target value; and generate a second result set by identifying one or more data records that include a field value that is essentially equivalent to at least one of the target values.

18. The searching system of claim 17 wherein the server system is coupled to a distributed computing network.

* * * * *